(12) United States Patent
Choi et al.

(10) Patent No.: US 8,341,391 B2
(45) Date of Patent: Dec. 25, 2012

(54) IMAGE REPRODUCING APPARATUS AND METHOD PERFORMING A FIRST BOOTING MODE IN WHICH ONLY SOME BOOTING OPERATIONS OF A SECOND BOOTING MODE ARE PERFORMED

(75) Inventors: Hyun-seok Choi, Seoul (KR); Sun-woo Kim, Suwon-si (KR); Sang-min Bae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 326 days.

(21) Appl. No.: 12/724,850

(22) Filed: Mar. 16, 2010

(65) Prior Publication Data

US 2011/0040959 A1  Feb. 17, 2011

(30) Foreign Application Priority Data

Aug. 14, 2009 (KR) ......................... 10-2009-0075338

(51) Int. Cl.
*G06F 9/00* (2006.01)
*H04N 7/173* (2011.01)
*G09G 5/00* (2006.01)

(52) U.S. Cl. ............................. 713/2; 725/131; 345/211
(58) Field of Classification Search ...................... 713/2
See application file for complete search history.

(56) References Cited

U.S. PATENT DOCUMENTS

| 5,515,080 | A * | 5/1996 | Nakamura et al. ............ 345/534 |
| 7,017,052 | B2 * | 3/2006 | Aklilu et al. ................... 713/300 |
| 7,188,239 | B2 * | 3/2007 | Funayama ........................ 713/2 |
| 7,705,842 | B2 * | 4/2010 | Panabaker et al. ............ 345/211 |
| 7,996,665 | B2 * | 8/2011 | Kimura et al. ..................... 713/2 |
| 8,031,213 | B2 * | 10/2011 | Hata et al. ..................... 345/690 |
| 2007/0130480 | A1 * | 6/2007 | Hill et al. ....................... 713/300 |
| 2008/0165288 | A1 | 7/2008 | Miller | |

FOREIGN PATENT DOCUMENTS

| KR | 10-2008-0010992 A | 1/2008 |
| KR | 10-2008-0064710 A | 7/2008 |
| KR | 10-2008-0075634 A | 8/2008 |

OTHER PUBLICATIONS

Communication dated Apr. 14, 2011 issued by the International Searching Authority in corresponding International Application No. PCT/KR2010/005209.

* cited by examiner

*Primary Examiner* — Suresh Suryawanshi
(74) *Attorney, Agent, or Firm* — Sughrue Mion, PLLC (57) ABSTRACT

An image reproducing apparatus and method of controlling the image reproducing apparatus are provided. The method of controlling the image reproducing apparatus includes: determining whether external power is supplied; performing a first booting operation when the external power is supplied; and controlling the image reproducing apparatus to operate in a sleep mode if an operation start signal is not received until the booting operation is completed. The method further includes controlling the image reproducing apparatus to perform a second booting operation to operate in a normal mode after an operation start signal is received. The method further includes performing a resuming operation so that the image reproducing apparatus operates in a normal mode when the operation start signal is received while the image reproducing apparatus operates in the sleep mode. The method further includes operating in an end mode when the sleep mode continues for a predetermined time or longer.

23 Claims, 6 Drawing Sheets

IMAGE REPRODUCING APPARATUS AND
METHOD PERFORMING A FIRST BOOTING
MODE IN WHICH ONLY SOME BOOTING
OPERATIONS OF A SECOND BOOTING
MODE ARE PERFORMED

CROSS-REFERENCE TO RELATED PATENT
APPLICATION

This application claims priority from Korean Patent Application No. 10-2009-0075338, filed on Aug. 14, 2009, in the Korean Intellectual Property Office, the disclosure of which is incorporated herein in its entirety by reference.

BACKGROUND

1. Field of the Exemplary Embodiments

The exemplary embodiments relate to an image reproducing apparatus and a method of controlling the image reproduction; and more particularly, to a broadcast reproducing apparatus and a method of controlling the broadcast reproduction.

2. Description of the Related Art

With the development of information and communication technology, user demand for large capacity and high quality image data is increasing. In particular, image output devices such as digital TVs are replacing analog TVs.

A digital TV receives a large amount of data to provide high image quality digital broadcasting. However, to provide digital broadcasting, the amount of broadcasting data to be processed is large and the processing is complicated. Thus, the time required for booting up digital TVs is longer than for analog TVs.

SUMMARY OF THE EXEMPLARY
EMBODIMENTS

The exemplary embodiments provide an image reproducing apparatus and method of controlling the image reproduction; and more particularly, a broadcast reproducing apparatus and a method of controlling the broadcast reproduction.

According to an aspect of the exemplary embodiments, there is provided a method of controlling an image reproducing apparatus, the method including: determining whether external power is supplied; performing a booting operation when the external power is supplied; and controlling the image reproducing apparatus to operate in a sleep mode if an operation start signal is not received until the booting operation is completed.

The performing of the booting operation may include performing the booting operation according to a first booting mode in which data is not outputted.

The performing of the booting operation may further include performing the booting operation according to a second booting mode in which data is output to when the operation start signal is received before a booting operation according to the first booting mode is completed.

The controlling may include performing a resuming operation so that the image reproducing apparatus operates in a normal mode when the operation start signal is received while the image reproducing apparatus operates in the sleep mode.

The performing of the resuming operation may include controlling data about a previous channel to be preferentially displayed.

The controlling may include controlling the image reproducing apparatus to operate in an end mode when the sleep mode continues for a critical time or longer.

The performing of the rebooting operation according to the first booting mode may include: driving an operational system; and loading an application into a memory.

The performing of the booting operation according to the second booting mode may include: tuning to a selected broadcasting channel; decoding data that is received by the broadcasting channel; and outputting the decoded data.

The controlling of the image reproducing apparatus to operate in the sleep mode may include controlling the blocking of a power supply to modules, except for a control module for performing the resuming operation and a memory in which non-volatile data is stored.

The image reproducing apparatus may comprise a digital TV (DTV).

According to another aspect of the exemplary embodiments, there is provided an image reproducing apparatus including: a power source unit to which external power is supplied; a booting unit performing a booting operation when the external power is supplied; and a control unit controlling the image reproducing apparatus to operate in a sleep mode if an operation start signal of the image reproducing apparatus is not received until the booting operation is completed.

BRIEF DESCRIPTION OF THE DRAWINGS

The above and other features and advantages of the exemplary embodiments will become more apparent by describing in detail exemplary embodiments thereof with reference to the attached drawings in which.

DETAILED DESCRIPTION OF THE
EXEMPLARY EMBODIMENTS

The exemplary embodiments will now be described more fully with reference to the accompanying drawings, in which exemplary embodiments are illustrated.

Figure 1:
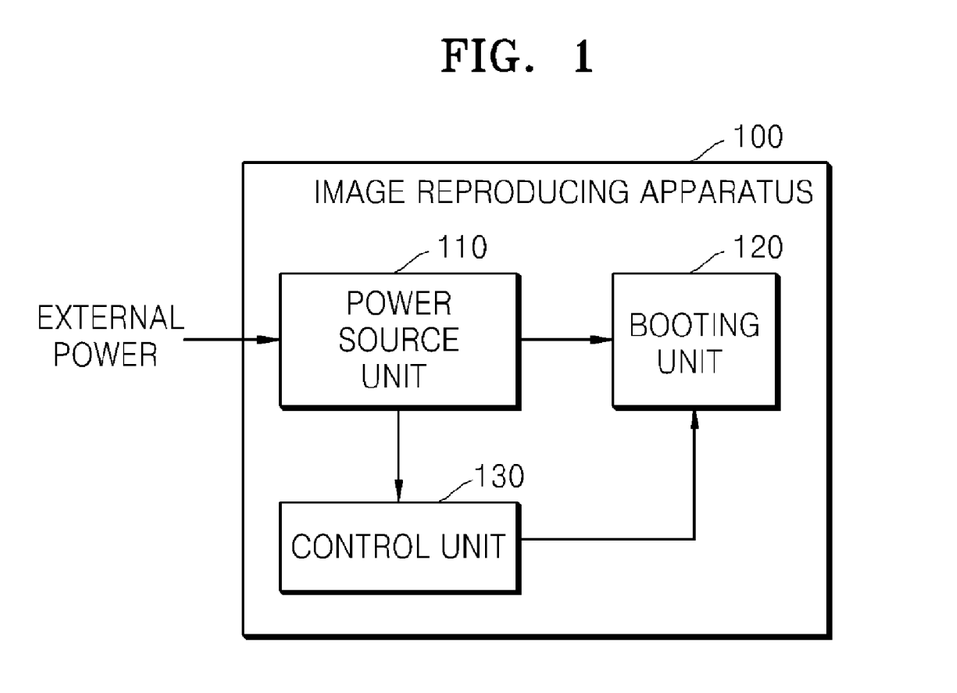
FIG. 1 is a block diagram illustrating an image reproducing apparatus according to an exemplary embodiment.

FIG. 1 is a block diagram illustrating an image reproducing apparatus 100 according to an exemplary embodiment. The image reproducing apparatus 100 may be any image reproducing apparatus, including a display unit on which an image is output. For example, the image reproducing apparatus 100 may be a digital TV (DTV).

The image reproducing apparatus 100 includes a power source unit 110, a booting unit 120, and a control unit 130.

External power is supplied to the power source unit 110. AC voltage of 110 V or 220 V may be applied to the power source unit 110. The supplied power is transmitted to each module in the image reproducing apparatus 100 by control unit 130.

The booting unit 120 boots the image reproducing apparatus 100 according to a booting mode.

According to an exemplary embodiment, a normal booting mode is referred to as a second booting mode, and a booting mode in which only some booting operations of the second booting mode are performed is referred to as a first booting mode. In particular, in the booting operations according to the first booting mode, operations related to outputting of processed data may not be performed. That is, according to the booting operations of the first booting mode, modules of the image reproducing apparatus 100 process data but do not output the processed data. That is, the processed data is not output to the outside via an output module such as a display unit or a speaker. Since during the booting operations according to the first booting mode the processed data is not output to the outside of the image reproducing apparatus 100, the user may not be aware that booting is in progress. Thus, the first booting mode may also be referred to as an internal booting mode in that the user may not be aware of the processing booting operation according to the first booting mode in progress.

For convenience of description, it is assumed that a booting operation according to the second booting mode comprises driving an operational system (OS), mounting necessary applications in a memory, tuning to a channel which is to be watched by a user or a channel that was last watched by the user, decoding data transmitted through the tuned channel, and outputting the decoded data via a display unit. However, the second booting mode does not necessarily consist of the above five operations but may comprise less or more operations.

In addition, the first booting mode may include only driving the OS and mounting necessary applications in the memory. Alternatively, all the operations of the second booting mode, except for the displaying decoded data, may be performed during the first booting mode.

When external power that has been previously blocked is supplied to the power source unit 110, the booting unit 120 performs a booting operation. The booting unit 120 may perform a booting operation according to the first booting mode when the external power is first supplied to the power source unit 110. If an operation start signal is received before the booting operation of the first booting mode is completed, a booting operation according to the second booting mode is performed continuously after the booting operation according to the first booting mode. That is, after driving an OS according to the first booting mode, if an operation start signal is received, remaining booting operations are performed. In this case, loading of an application according to the second booting mode is first performed and then the remainder of the remaining booting operations are performed.

The operation start signal is a signal that is generated when the user presses a 'power on' button or a 'start' button via an interface such as a remote control. That is, the operation start signal is generated as the user requires a start of the operation of the image reproducing apparatus 100. Similarly, an operation end signal is a signal that is generated when the user presses a 'power off' button or an 'end' button via an interface such as a remote control.

The control unit 130 determines an operational mode of the image reproducing apparatus 100, and controls the image reproducing apparatus 100 to operate according to the determined operational mode.

The operational mode is divided into an end mode, a sleep mode, and a normal mode according to an exemplary embodiment.

First, in an end mode, external power is not supplied to the image reproducing apparatus 100, and even when external power is supplied thereto, all or most modules of the image reproducing apparatus 100 do not operate. For example, only an interface module that receives a signal from a remote control may operate in the end mode.

Next, in the sleep mode, some hardware drivers or modules of the image reproducing apparatus 100 do not operate, or are maintained at a minimum consumption power. For example, power may be supplied only to a memory unit and an interface unit that receives a remote controller signal, and the power to other modules may be blocked. In the sleep mode, data is not output; but if a driving start signal is transmitted from the user, the sleep mode may be quickly converted into a normal mode by a resuming operation.

Finally, in the normal mode, most or all modules of the image reproducing apparatus 100 operate. In the normal mode, the image reproducing apparatus 100 may normally output data to the outside.

If an operation start signal is not received from the outside until a booting operation according to the first booting mode is completed, the control unit 130 controls the image reproducing apparatus 100 to operate in a sleep mode.

For example, the control unit 130 may control that power is supplied only to a memory in which an application or a boot image is stored and to a module for performing a resuming operation, and not to other modules related to outputting, such as a display unit, a speaker unit, or a channel tuning unit. According to the current embodiment, the control unit 130 may perform a resuming operation, but alternatively, a central processing unit (CPU) or the booting unit 120 of the image reproducing apparatus 100 may perform a resuming operation.

When a booting operation according to the second booting mode is performed, for example, upon receiving an operation start signal while a booting operation according to the first booting mode is being performed, the control unit 130 controls the image reproducing apparatus 100 to operate in the normal mode.

Also, when an operation start signal is received while the image reproducing apparatus 100 operates in a sleep mode, the control unit 130 performs a resuming operation so as to control the image reproducing apparatus 100 to operate in a normal mode. When a booting operation according to the first booting mode is completed, a boot image may be stored in the memory. The control unit 130 may perform a resuming operation by using a boot image stored in the memory.

Conventional DTVs do not have a sleep mode. Accordingly, the viewer can watch broadcasting programs when the booting operation according to the second booting mode is completed. Since the booting operation according to the second booting mode takes a long time, the viewer can watch a program a considerable period of time after pressing a power on button of a remote control.

However, according to an exemplary embodiment, a sleep mode is included as one of operational modes of the DTV, and when an operation start signal is received in the sleep mode, a resuming operation is conducted to provide broadcasting contents. Since the booting operation according to the second booting mode takes longer than the resuming operation, the user may receive broadcasting contents more quickly than in the conventional art.

The control unit 130 may control a display unit (not shown) such that data about a previous channel is preferentially output when performing a resuming operation. For example, if the image reproducing apparatus 100 is a DTV, the control unit 130 performs a resuming operation to display broadcasting contents corresponding to a selected channel. Here, data about the previous channel is displayed before the broadcasting contents corresponding to the selected channel, and thus the user may quickly convert channels. The data on the previous channel may be stored, for example, in the memory.

According to the conventional art, when an operation start signal is input by the user, operations related to outputting broadcasting contents are first performed, and then data regarding a channel is output. For example, a tuning operation for a selected channel (e.g., a channel last selected) is performed, and then a series of operations such as data reception from the tuned channel, data decoding, data outputting, etc. are performed. Next, data about the channel through which broadcasting data is output is provided. Accordingly, it takes a considerable amount of time until the user obtains data about the channel. If the user wants to change to another channel after checking the data about the channel, it is not efficient because the above-described operations need to be performed again.

However, according to the exemplary embodiment, data about a previous channel is processed first and output before broadcasting data is provided, and thus the user can quickly be aware of the data about the channel. Also, when the user wants to change the channel, it is efficient because only broadcasting data of a channel which is to be changed to needs to be processed and provided.

If the sleep mode continues for a critical time or longer, the control unit 130 may control the image reproducing apparatus 100 to operate in an end mode.

In the sleep mode, the memory needs to be continuously refreshed so that the boot image stored in the memory is not deleted. Accordingly, power is continuously consumed in refreshing the memory. According to an exemplary embodiment, the image reproducing apparatus 100 operates in the end mode after a predetermined period of time passes, thereby reducing power consumption. Here, the critical time may be directly set by the user or set automatically by control unit 130 by analyzing previous viewing details.

Figure 2:
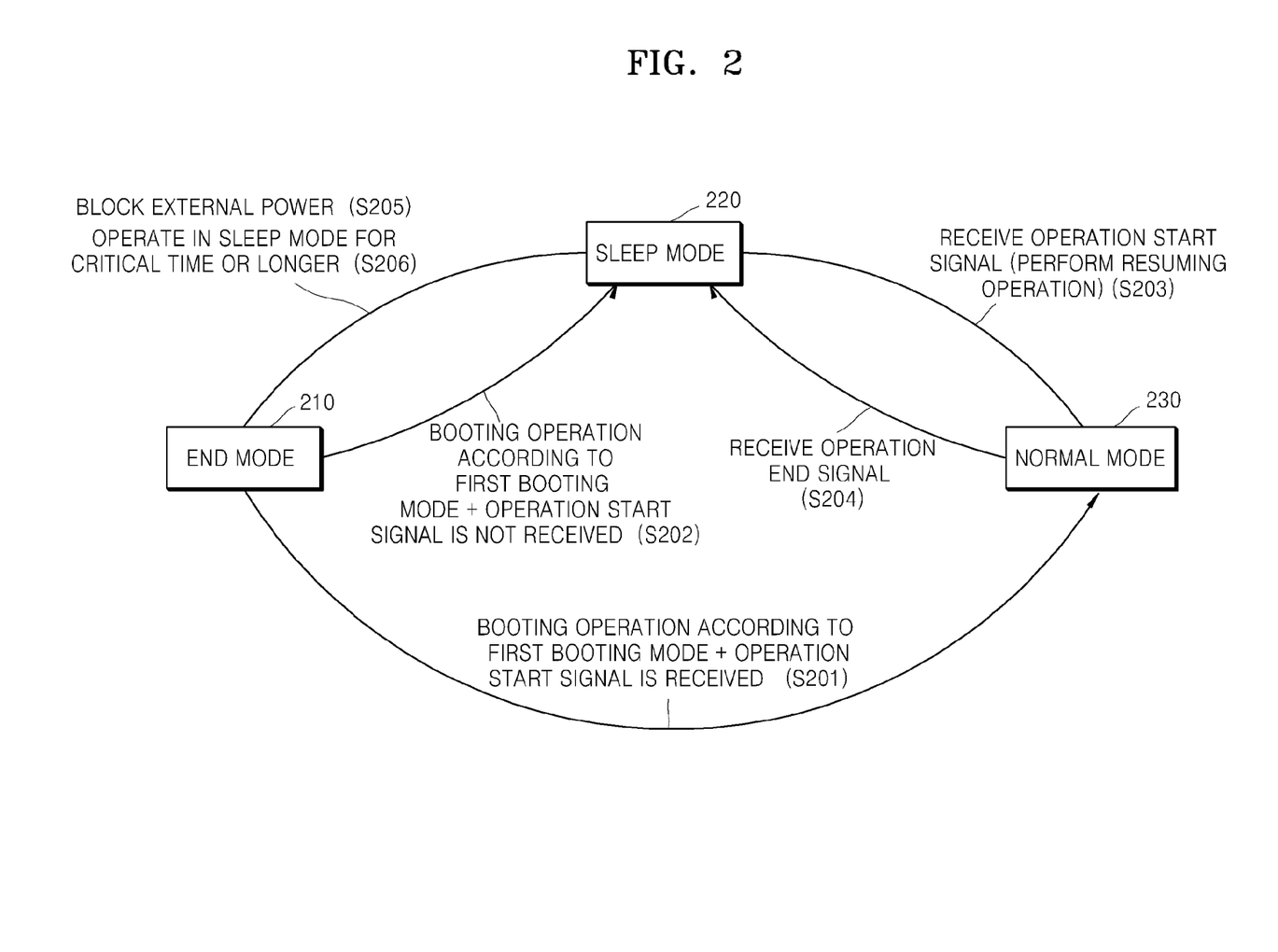
FIG. 2 illustrates a conversion of an operational mode of an image reproducing apparatus according to an exemplary embodiment.

FIG. 2 illustrates a conversion of an operational mode of the image reproducing apparatus 100 according to an exemplary embodiment.

In operation S201, when external power is supplied to the image reproducing apparatus 100 in an end mode 210, the booting unit 120 boots the image reproducing apparatus 100 according to a first booting mode. If an operation start signal is received from the user before the booting operation according to the first booting mode is completed, the booting unit 120 boots the image reproducing apparatus 100 according to a second booting mode continuously after the currently processed booting operation. When the booting operation is completed according to the second booting mode, the image reproducing apparatus 100 operates in a normal mode 230.

On the other hand, if an operation start signal is not transmitted from the user until the booting operation according to the first booting mode is completed, the image reproducing apparatus 100 operates in a sleep mode 220.

In operation S203, if an operation start signal is transmitted from the user in the sleep mode 220, the control unit 130 performs a resuming operation. When the resuming operation is completed, the image reproducing apparatus 100 operates in the normal mode 203.

In operation S204, when an operation end signal is transmitted from the user in the normal mode 230, the image reproducing apparatus 100 operates in the sleep mode 220.

In operation S205, when external power to the image reproducing apparatus 100 is blocked in the sleep mode 220, the operational mode of the image reproducing apparatus 100 is changed to the end mode 210. Also, when the image reproducing apparatus 100 operates in the sleep mode 220 for a predetermined period of critical time or longer, the operational mode of the image reproducing apparatus 100 may be changed to the end mode 210.

Also, although not shown in FIG. 2, the operational mode of the image reproducing apparatus 100 may be changed to the end mode 210 when the external power to the image reproducing apparatus 100 is blocked in the normal mode 230. In this case, the control unit 130 recognizes the external power being blocked as an abnormal end so that when the external power is supplied to the image reproducing apparatus 100 again, the image reproducing apparatus 100 may be controlled to operate in the normal mode 230 even if an operation start signal is not transmitted from the user.

FIGS. 3A through 3D illustrate an operation of an image reproducing apparatus 400 with respect to time, according to an exemplary embodiment. For convenience of description, it is assumed that a time for completing a booting operation according to the first booting mode is 5 seconds, a time for completing a booting operation according to the second booting mode is 8 seconds, and a time for completing a resuming operation is 4 seconds.

Figure 3A:
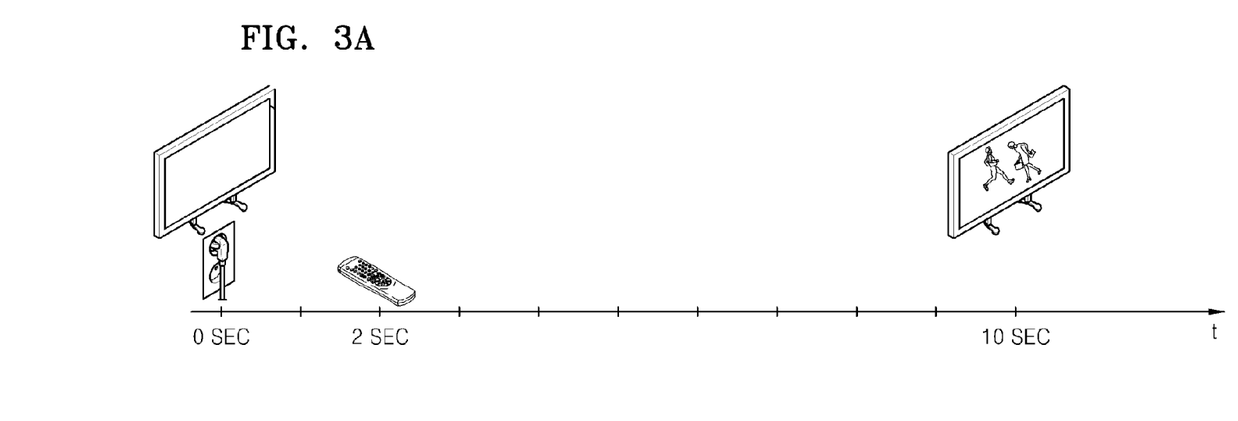
FIG. 3A, FIG. 3B, FIGS. 3C and 3D illustrate an operation of an image reproducing apparatus according to time, according to an exemplary embodiment.
Figure 3B:
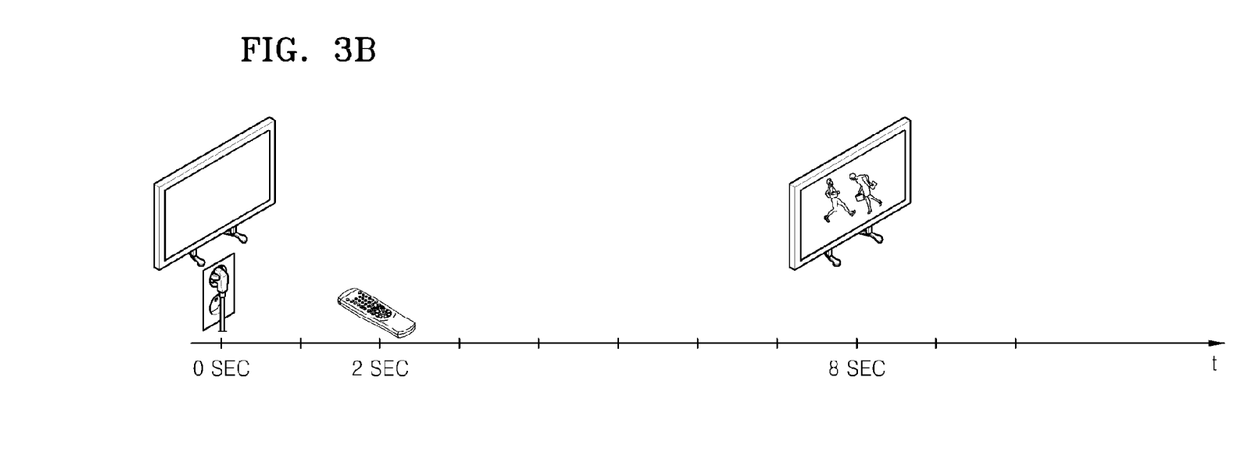

FIGS. 3A and 3B illustrate operations of an image reproducing apparatus when an operation start signal is received 2 seconds after external power is first supplied thereto.

FIG. 3A illustrates an operation of an image reproducing apparatus according to the conventional art.

Here, external power is supplied to the image reproducing apparatus at 0 seconds. Since a booting operation is started when an operation start signal is received according to the conventional art, no operation is performed at a point of time when the external power is first supplied.

An operation start signal is received 2 seconds after the external power is first supplied. According to the conventional art, only a normal booting mode corresponding to the second booting mode of the exemplary embodiment exists, and thus a booting operation is performed according to the normal booting mode.

The booting operation is completed 10 seconds after the external power is first supplied, and broadcasting contents are provided.

FIG. 3B illustrates an operation of an image reproducing apparatus according to an exemplary embodiment.

When external power is supplied to the image reproducing apparatus, the image reproducing apparatus is booted according to a first booting mode. Accordingly, a booting operation according to the first booting mode is performed from 0 seconds.

An operation start signal is received 2 seconds after the external power is first supplied. At the point of time when the operation start signal is received, a booting operation according to the first booting mode is still being performed. Accordingly, a booting operation according to a second booting mode is performed continuously after the booting operation that is being currently performed after the 2 seconds has passed.

The booting operation is completed 8 seconds after the external power is first supplied, and broadcasting contents are provided.

According to the conventional art, a booting operation is started at a point of time when an operation start signal is received. Since the user cannot supply external power and manipulate a remote controller at the same time, no operation is performed until an operation start signal is received after the external power is first supplied.

However, according to the exemplary embodiment, a booting operation is performed from the moment the external power is first supplied, thereby reducing a time needed for booting the image reproducing apparatus.

Figure 3C:
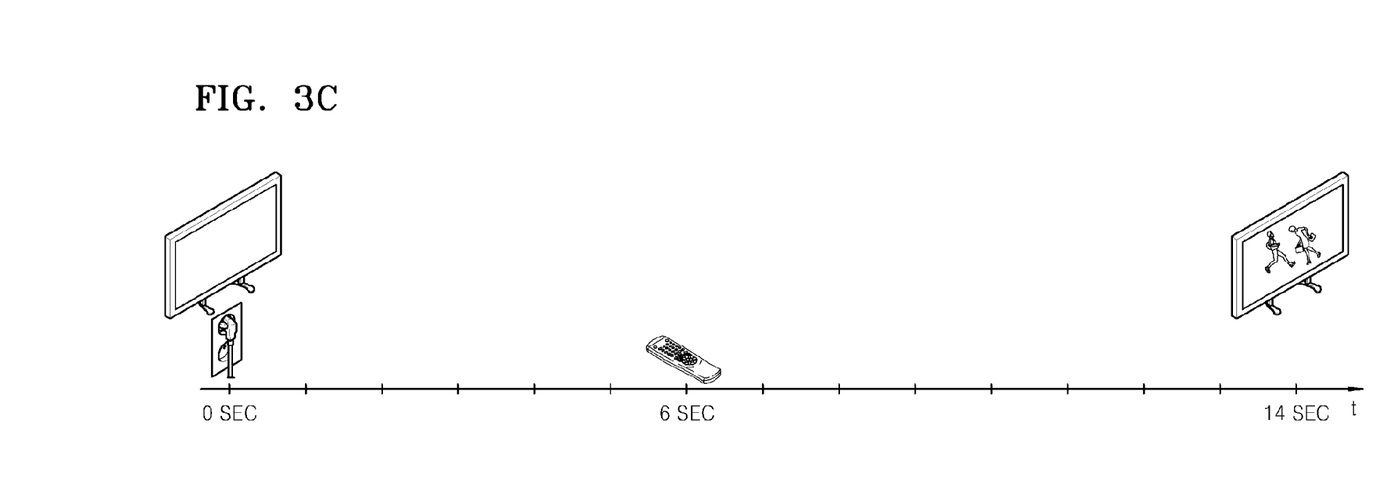
Figure 3D:
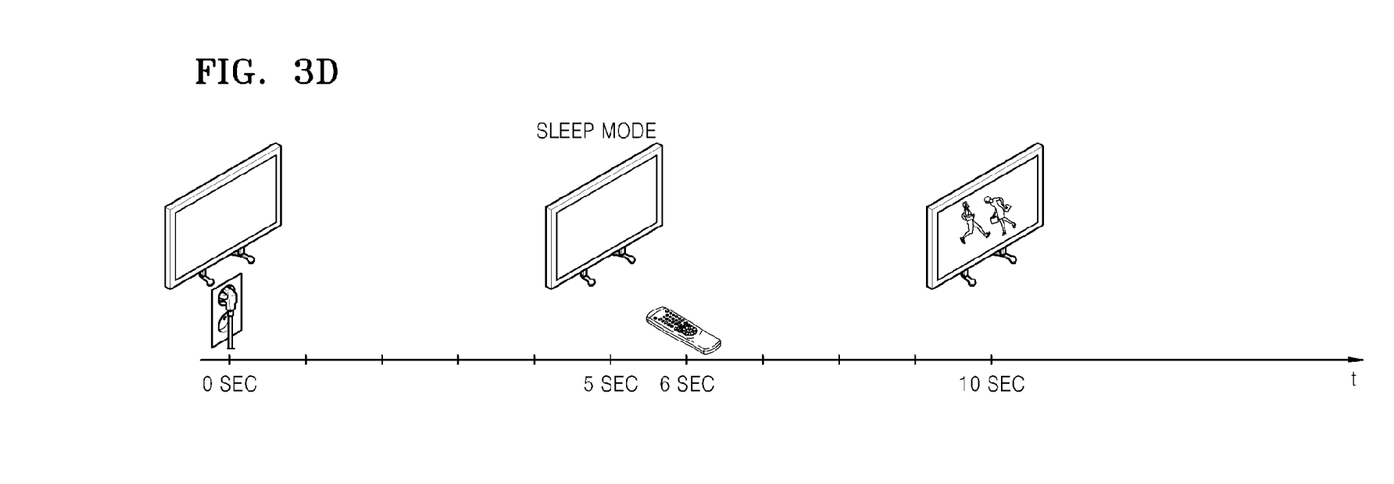

FIGS. 3C and 3D illustrate operations of an image reproducing apparatus when an operation start signal is received 6 seconds after an external power is first supplied.

In detail, FIG. 3C illustrates an operation of an image reproducing apparatus according to the conventional art.

Here, external power is supplied to the image reproducing apparatus at 0 seconds. No operation is performed when the external power is supplied.

An operation start signal is received 6 seconds after the external power is first supplied. A booting operation is performed according to a normal booting mode from the moment the operation start signal is received.

The booting operation is completed 8 seconds after the operation start signal is supplied, and broadcasting contents are provided.

FIG. 3D illustrates an operation of an image reproducing apparatus according to an embodiment of the present general inventive concept.

When external power is supplied to the image reproducing apparatus, the image reproducing apparatus is booted according to a first booting mode.

5 seconds after the external power is first supplied, the booting operation according to the first booting mode is completed. Since an operation start signal is not received until the booting operation according to the first booting mode is completed, the image reproducing apparatus operates in a sleep mode.

An operation start signal is received 6 seconds after the external power is first supplied. A resuming operation is performed from the moment when the operation start signal is received.

The resuming operation is ended 6 seconds after the operation start signal is supplied, and then broadcasting contents are provided.

The resuming operation takes much less time than a booting operation according to a normal booting mode, and thus broadcasting contents may be quickly provided to the user.

Figure 4:
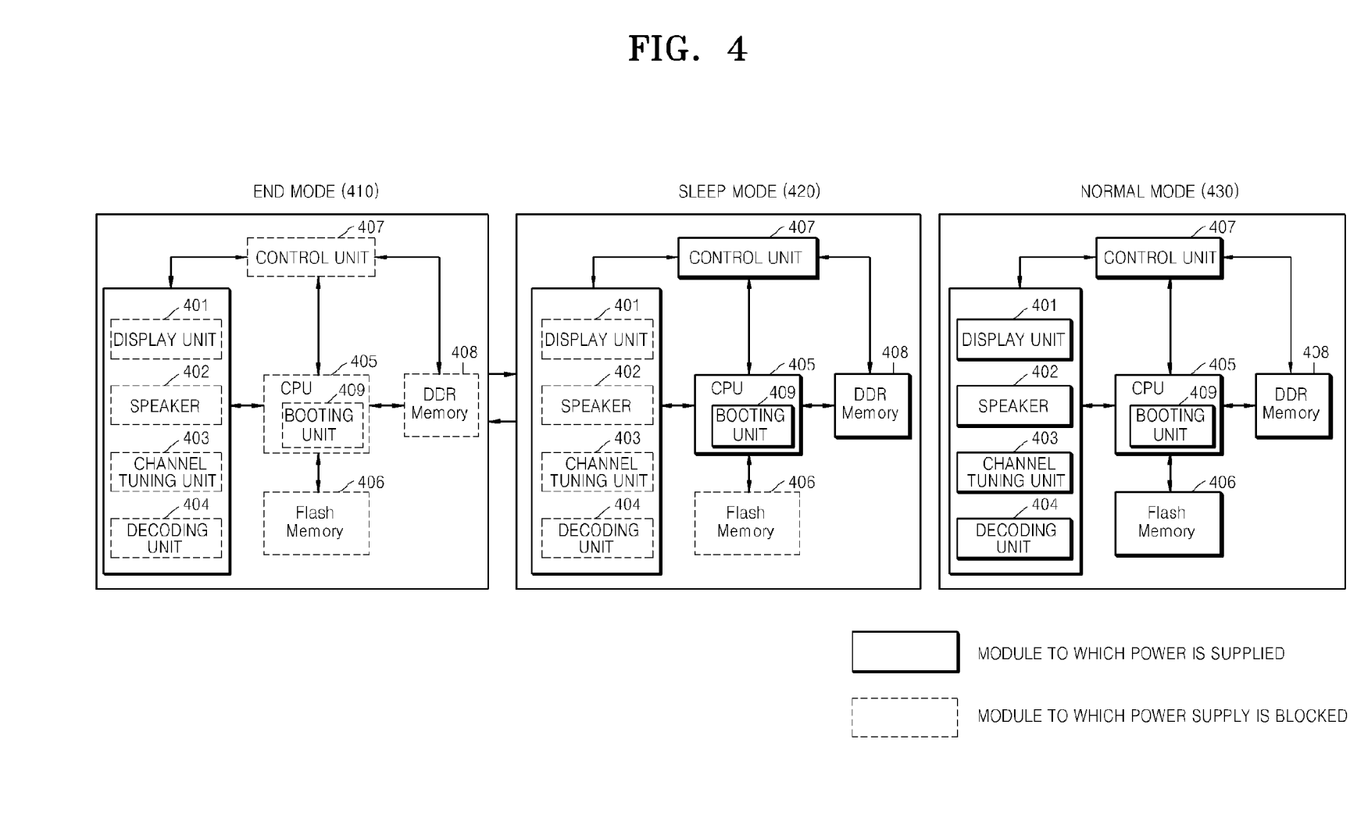
FIG. 4 illustrates a state of an internal module of an image reproducing apparatus according to operational states.

FIG. 4 illustrates a state of an internal module of an image reproducing apparatus 400 according to operational states thereof. For convenience of description, the image reproducing apparatus 400 is assumed to include a display unit 401, a speaker 402, a channel tuning unit 403, a decoding unit 404, a CPU 405, a flash memory unit 406, a control unit 407, and a double data rate (DDR) memory unit 408. However, elements of the image reproducing apparatus 400 are not limited thereto. At least one module may be either included or omitted. Also, a booting unit 409 is included in the CPU 405 but may also be separated from the CPU 405 or combined with the control unit 407.

In FIG. 4, modules illustrated with a solid line denote modules to which power is supplied, and modules illustrated with a dotted line denote modules to which power is not supplied.

In an end mode (410), power is not supplied to all of the modules.

When external power is supplied in the end mode 410, a booting operation is performed according to a first booting mode. In the current embodiment, power is supplied to modules related to the booting operation according to the first booting mode. Referring to FIG. 4, power may be supplied to the CPU 405, the flash memory unit 406, and the DDR memory unit 407.

If an operation start signal is not received until the booting operation according to the first booting mode is completed, the image reproducing apparatus 400 operates in a sleep mode. In a sleep mode (420), power is supplied only to the CPU 405, control unit 407, and DDR memory unit 408. When the booting operation according to the first booting mode is completed, a boot image is stored in the DDR memory unit 408 and booting unit 409. Power is continuously supplied to the DDR memory unit 408 so that the boot image is not deleted but retained.

When an operation start signal is received in the sleep mode 420, the image reproducing apparatus 400 operates in a normal mode 430. In the normal mode 430, power is supplied to all modules.

Figure 5:
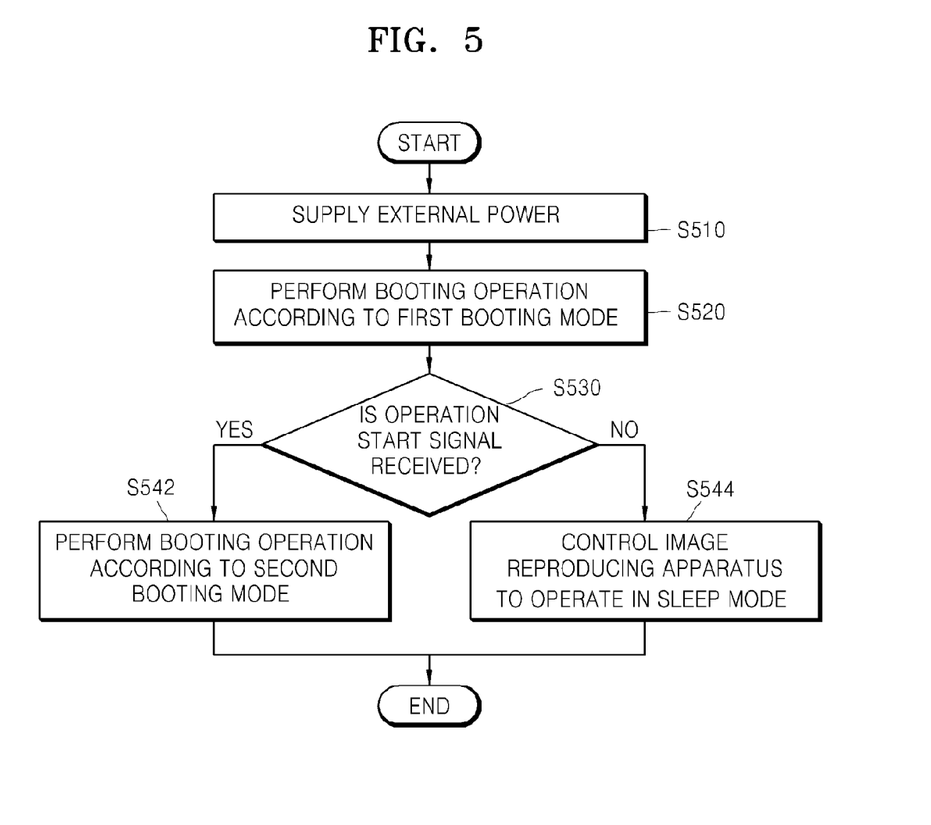
FIG. 5 is a flowchart illustrating a method of controlling an image reproducing apparatus according to an exemplary embodiment.

FIG. 5 is a flowchart illustrating a method of controlling an image reproducing apparatus according to an exemplary embodiment.

In operation S510, external power is supplied to the image reproducing apparatus.

In operation S520, a booting operation in which data is not output to the outside is performed. In operation S520, it is assumed that the booting operation is performed according to a first booting mode in which data is not output to the outside.

In operation S530, whether an operation start signal is received before the booting operation according to the first booting mode is completed is determined. If an operation start signal is received before the booting operation according to the first booting mode is completed, operation S542 is performed, and if an operation start signal is not received until the booting operation according to the first booting mode is completed, operation S544 is performed.

In operation S542, a booting operation according to the second booting mode in which data is output to the outside is performed continuously after the currently performed booting operation. When the booting operation according to the second booting mode is completed, the image reproducing apparatus is controlled to operate in the sleep mode.

In operation S544, when the booting operation according to the first booting mode is completed, the image reproducing apparatus is controlled to operate in the sleep mode.

The embodiments of the exemplary embodiment can be written as computer programs and can be implemented in general-use digital computers that execute the programs using a computer readable medium.

Examples of the computer readable medium include a recording medium such as magnetic storage media (e.g., ROM, floppy disks, hard disks, etc.), optical recording media (e.g., CD-ROMs, or DVDs), and transmission media such as carrier waves (e.g., transmission through the Internet).

While the exemplary embodiments has been particularly shown and described with reference to preferred embodiments thereof, it will be understood by those of ordinary skill in the art that various changes in form and details may be made therein without departing from the spirit and scope of the exemplary embodiments as defined by the appended claims. The preferred embodiments should be considered in a descriptive sense only and not for purposes of limitation. Therefore, the scope of the exemplary embodiments is defined not by the detailed description of the exemplary embodiments but by the appended claims, and all differences within the scope will be construed as being included in the exemplary embodiments.

What is claimed is:

1. A method of controlling an image reproducing apparatus, the method comprising:
    determining whether external power is supplied for the image reproducing apparatus;
    performing a booting operation according to a first booting mode when the external power is supplied; and
    controlling the image reproducing apparatus to operate in a sleep mode when an operation start signal is not received until the booting operation according to the first mode is completed; and
    performing the booting operation according to a second booting mode when the operation start signal is received,
    wherein the first booting mode is different from the second booting mode and is a booting mode in which only some booting operations of the second booting mode are performed.

2. The method of claim 1, wherein data is not outputted in the first booting mode.

3. The method of claim 2, wherein data is outputted in the second booting mode when the operation start signal is received before a booting operation according to the first booting mode is completed.

4. The method of claim 1, wherein the controlling comprises performing a resuming operation so that the image reproducing apparatus operates in a normal mode when the operation start signal is received while the image reproducing apparatus operates in the sleep mode.

5. The method of claim 4, wherein the performing of the resuming operation comprises controlling data about a previous channel to be preferentially displayed.

6. The method of claim 1, wherein the controlling comprises controlling the image reproducing apparatus to operate in an end mode when the sleep mode continues for a predetermined time or longer.

7. The method of claim 2, wherein the performing of the rebooting operation according to the first booting mode comprises:
driving an operational system; and
loading an application into a memory.

8. The method of claim 3, wherein the performing of the booting operation according to the second booting mode comprises:
tuning a selected broadcasting channel;
decoding data that is received by the broadcasting channel; and
outputting the decoded data.

9. The method of claim 4, wherein the controlling of the image reproducing apparatus to operate in the sleep mode comprises blocking a power supply to modules within the image reproducing apparatus, except for a control module for performing the resuming operation and a memory in which non-volatile data is stored.

10. The method of claim 1, wherein the image reproducing apparatus comprises a digital TV (DTV).

11. An image reproducing apparatus comprising:
a power source unit to which external power is supplied;
a booting unit which performs a booting operation according to a first booting mode when the external power is supplied and which performs the booting operation according to a second booting mode when an operation start signal is received; and
a control unit which controls the image reproducing apparatus to operate in a sleep mode when the operation start signal of the image reproducing apparatus is not received until the booting operation according to the first booting mode is completed,
wherein the first booting mode is different from the second booting mode and is a booting mode in which only some booting operations of the second booting mode are performed.

12. The image reproducing apparatus of claim 10, wherein data is not outputted in the first booting mode, when the external power is first supplied.

13. The image reproducing apparatus of claim 12, wherein the data is outputted in the second booting mode, when the operation start signal is received before the booting operation according to the first mode is completed.

14. The image reproducing apparatus of claim 11, wherein the control unit comprises a resume performing unit which performs a resuming operation so that the image reproducing apparatus operates in a normal mode when the operation start signal is received while the image reproducing apparatus operates in the sleep mode.

15. The image reproducing apparatus of claim 14, further comprising a display unit, wherein the resume performing unit controls data about a previous channel that is preferentially displayed in the display unit before broadcasting data is displayed.

16. The image reproducing apparatus of claim 11, wherein the control unit further controls the image reproducing apparatus to operate in an end mode if the sleep mode continues for a predetermined time or longer.

17. The image reproducing apparatus of claim 12, wherein the booting operation according to the first booting mode comprises at least one of driving an operational system and loading an application.

18. The image reproducing apparatus of claim 13, wherein the booting operation according to the second booting mode comprises at least one of tuning a selected broadcasting channel, decoding data that is received by the broadcasting channel, and outputting the decoded data.

19. The image reproducing apparatus of claim 11, wherein when the image reproducing apparatus operates in the sleep mode, the control unit controls blocking a power supply to modules of the image reproducing apparatus, except for the resume performing unit and a memory in which non-volatile data is stored.

20. The image reproducing apparatus of claim 11, wherein the image reproducing apparatus comprises a digital TV (DTV).

21. A non-transitory computer readable recording medium having embodied thereon a program, wherein the program, when executed on a processor, executes the method of claim 1.

22. A method of controlling an image reproducing apparatus, the method comprising:
determining whether external power is supplied to the image reproducing apparatus;
performing a first booting operation when the external power is supplied;
controlling the image reproducing apparatus to operate in a sleep mode when an operation start signal is not received until the booting operation is completed; and
controlling the image reproducing apparatus to perform a second booting operation for operating the image reproducing apparatus in a normal mode after an operation start signal is received,
wherein the first booting operation is different from the second booting operation and wherein in the first booting operation only some booting operations of the second booting operation are performed.

23. An image reproducing apparatus comprising:
a power source unit to which external power is supplied;
a booting unit which performs a first booting operation when the external power is supplied;
a control unit which controls the image reproducing apparatus to operate in a sleep mode when an operation start signal of the image reproducing apparatus is not received until the booting operation is completed; and
the booting unit performing a second booting operation for operating the image processing apparatus in a normal mode after an operation start signal is received,
wherein the first booting operation is different from the second booting operation and wherein in the first booting operation only some booting operations of the second booting operation are performed.

* * * * *